US008564804B2

(12) United States Patent
Sakurai et al.

(10) Patent No.: US 8,564,804 B2
(45) Date of Patent: Oct. 22, 2013

(54) INFORMATION PROCESSING APPARATUS THAT DOES NOT TRANSMIT PRINT JOB DATA WHEN BOTH ENCRYPTION AND SAVING IN A PRINTING APPARATUS ARE DESIGNATED, AND CONTROL METHOD AND MEDIUM THEREFOR

(75) Inventors: Masakatsu Sakurai, Toride (JP); Yoshio Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/296,673

(22) Filed: Nov. 15, 2011

(65) Prior Publication Data

US 2012/0057187 A1 Mar. 8, 2012

Related U.S. Application Data

(63) Continuation of application No. 11/186,863, filed on Jul. 22, 2005, now Pat. No. 8,081,327.

(30) Foreign Application Priority Data

Jun. 10, 2005 (JP) ................................. 2005-171664

(51) Int. Cl.
*G06K 15/00* (2006.01)
(52) U.S. Cl.
USPC .......... 358/1.14; 358/1.13; 358/1.15; 380/28; 380/51; 380/201
(58) Field of Classification Search
USPC ............ 358/1.13, 1.14, 1.15; 380/28, 51, 201
See application file for complete search history.

(56) References Cited

U.S. PATENT DOCUMENTS

| 6,438,574 | B1 | 8/2002 | Nagashima |
| 6,943,907 | B1 | 9/2005 | Kim |
| 7,271,925 | B2 | 9/2007 | Nishiyama |
| 2001/0006551 | A1 | 7/2001 | Masaki |
| 2001/0021926 | A1 | 9/2001 | Schneck et al. |
| 2002/0032703 | A1 | 3/2002 | Gassho et al. |
| 2002/0036790 | A1* | 3/2002 | Nishiyama ................. 358/1.14 |
| 2003/0066878 | A1* | 4/2003 | Mahoney et al. ............ 235/380 |
| 2003/0126443 | A1 | 7/2003 | Wakao |
| 2004/0125402 | A1 | 7/2004 | Kanai et al. |
| 2004/0156068 | A1 | 8/2004 | Yoshida et al. |
| 2005/0018249 | A1 | 1/2005 | Miura et al. |
| 2005/0057774 | A1* | 3/2005 | Maruyama .................. 358/1.15 |
| 2005/0063002 | A1 | 3/2005 | Sugahara |
| 2005/0100378 | A1* | 5/2005 | Kimura et al. ................. 400/76 |

(Continued)

FOREIGN PATENT DOCUMENTS

| JP | 9-134264 A | 5/1997 |
| JP | 11-150559 A | 6/1999 |
| JP | 11-212744 A | 8/1999 |

*Primary Examiner* — Jacky X Zheng
(74) *Attorney, Agent, or Firm* — Fitzpatrick, Cella, Harper & Scinto

(57) ABSTRACT

Print job data is generated in accordance with a printing instruction from an application. When encryption of the print job data is designated, the generated print job data is encrypted, and the generated or encrypted print job data is output. When a printing apparatus serving as an output destination to which the encrypted print job data is output does not have a decryption function of decrypting the encrypted print job data, the output destination is changed to a decryption apparatus having the decryption function. When designation to save the print job data in the printing apparatus is detected in encryption, the print job is canceled.

8 Claims, 21 Drawing Sheets

(56) References Cited

U.S. PATENT DOCUMENTS

| | | |
|---|---|---|
| 2005/0111013 A1 | 5/2005 | Maekawa |
| 2005/0141010 A1 | 6/2005 | Kanai |
| 2005/0219610 A1 | 10/2005 | Kimura et al. |
| 2006/0106812 A1 | 5/2006 | Blumenau et al. |
| 2006/0174136 A1 | 8/2006 | Lyons et al. |
| 2006/0244997 A1* | 11/2006 | Watabe ........................ 358/1.16 |

* cited by examiner

F I G. 16
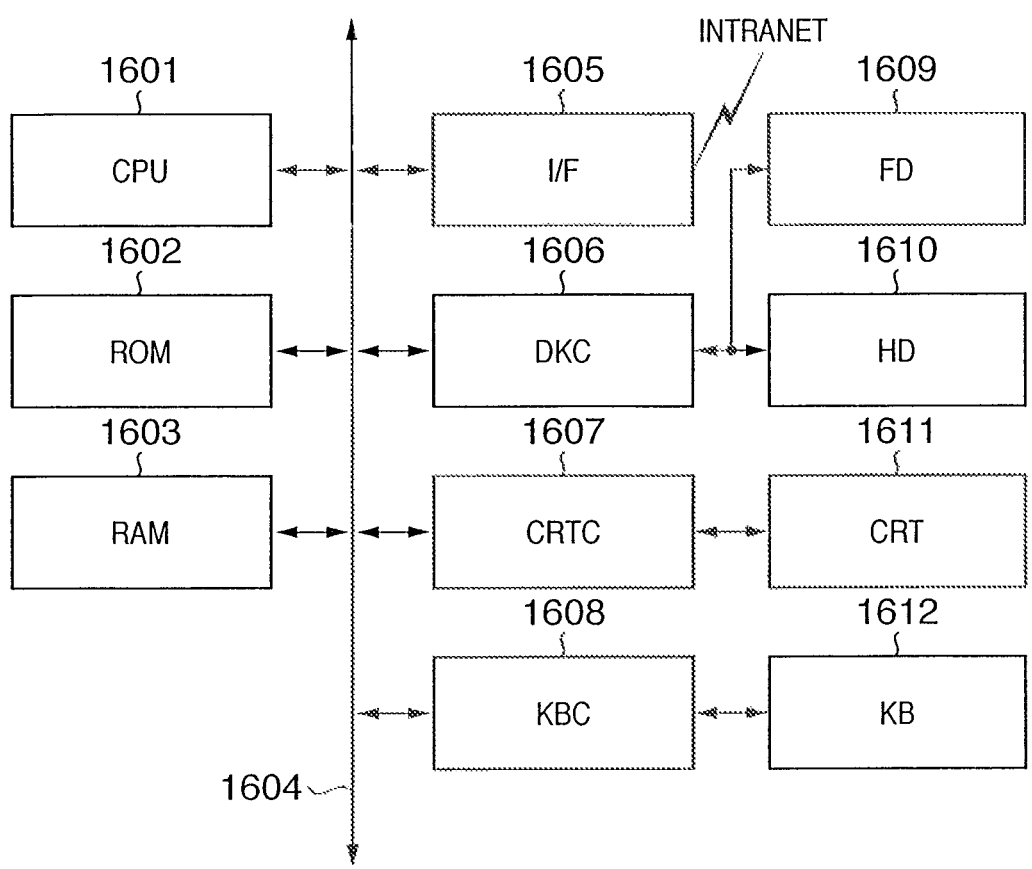

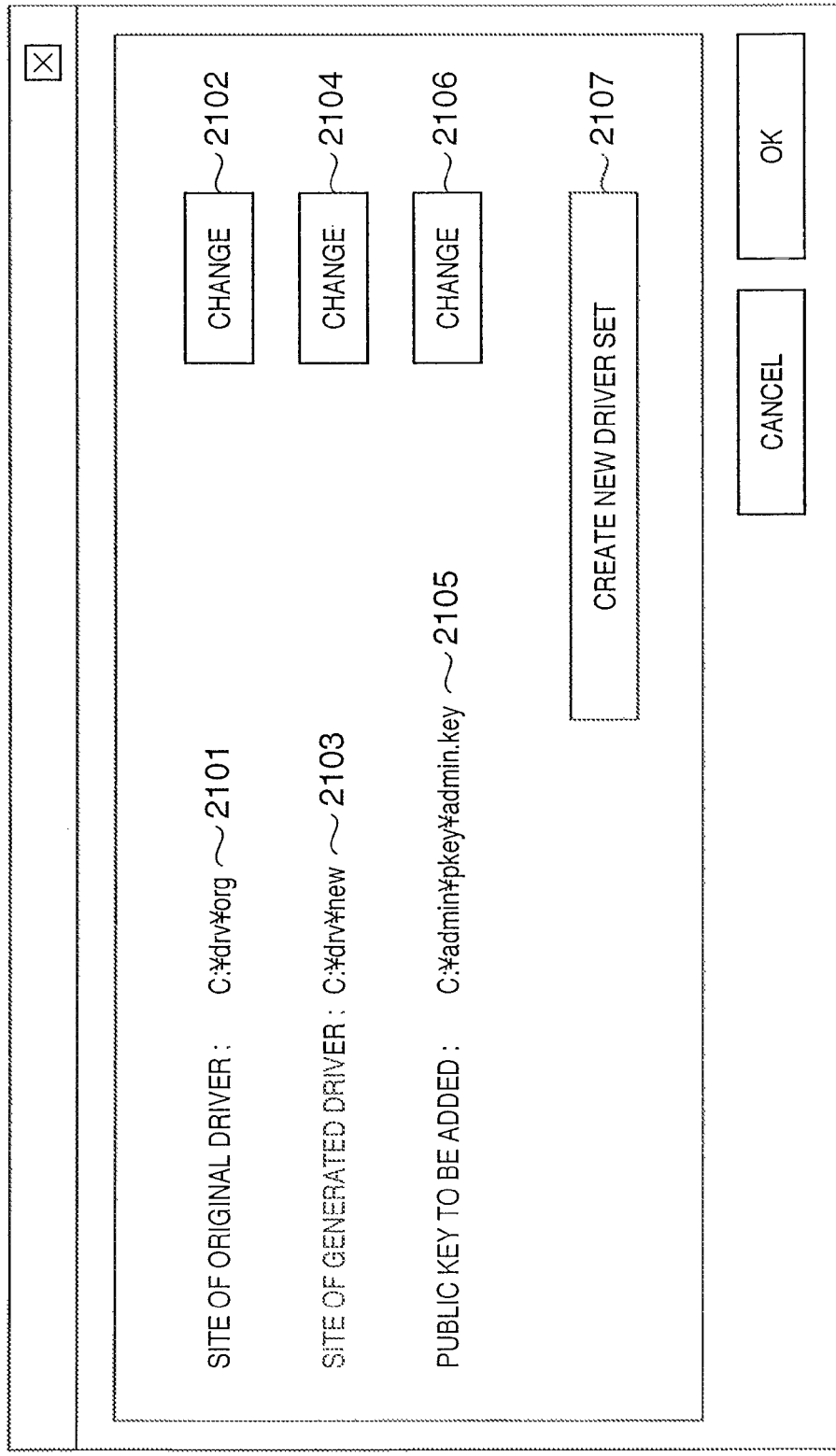

INFORMATION PROCESSING APPARATUS THAT DOES NOT TRANSMIT PRINT JOB DATA WHEN BOTH ENCRYPTION AND SAVING IN A PRINTING APPARATUS ARE DESIGNATED, AND CONTROL METHOD AND MEDIUM THEREFOR

This is a continuation of U.S. patent application Ser. No. 11/186,863, filed Jul. 22, 2005, now pending.

FIELD OF THE INVENTION

The present invention relates to a technique of encrypting and outputting print job data.

BACKGROUND OF THE INVENTION

Recently, printing systems are becoming popular in which client PCs (Personal Computers) are connected to a printing apparatus via a network and share the printing apparatus. When the users of the client PCs use the printing apparatus in this printing system, the users often stay away from the printing apparatus at the start of printing, and printed materials may attract the eye of a third party, losing confidentiality.

Under such a circumstance, there is proposed a printing system which takes a measure to protect a printed material from the eye of a third party (see, e.g., prior art reference 1: Japanese Patent Laid-Open No. 11-212744). In prior art reference 1, at the start of printing, the user inputs, e.g., a personal identification number or password into a client PC, and the client PC issues a print job with the personal identification number or password to a printing apparatus. Upon reception of the print job with the personal identification number or password, the printing apparatus temporarily stores it in a storage such as a memory or hard disk in the printing apparatus. The user comes to the printing apparatus and inputs his personal identification number or password from the panel of the main body, and then the printing apparatus starts printing. Printing starts while the user is in front of the printing apparatus, and his printed material can be protected from the eye of a third party.

In order to start printing while the user is in front of the printing apparatus, a target print job must be specified. In general, a method of selecting a desired job by the user from a job list displayed on the screen of the printing apparatus, inputting his password, and then starting printing is adopted. In order to improve user's convenience, there is also proposed a method using an ID card instead of prompting the user to select a job or input his password (see, e.g., prior art reference 2: Japanese Patent Laid-Open No. 11-150559).

In prior art reference 2, ID information registered in an ID card is used as a personal identification number or password. When the ID card is inserted into a printing apparatus, the printing apparatus reads out the ID information, finds out a job which coincides with the readout ID information, and starts printing.

However, a printed material may be illicitly acquired by monitoring print jobs flowing through a network, copying a print job, and separately transmitting the copied print job to a printing apparatus. A printed material may also be illicitly acquired by copying data itself stored in a printing apparatus and separately transmitting the data to a printing apparatus.

To prevent this, there is proposed a system which encrypts print jobs flowing through a network and jobs stored in a printing apparatus (see, e.g., prior art reference 3: Japanese Patent Laid-Open No. 09-134264).

When a new printing system which encrypts data between a client PC and a printer is to be built, the client and printer environments are also renewed. To the contrary, to introduce an encryption printing function into a constructed printing environment, the encryption function must be provided to a print data generation unit having no encryption function so as to expand the existing printing environment, and the decryption function must be provided to a printing apparatus having no decryption function. The encryption printing system cannot be provided without greatly changing a conventional system configuration.

SUMMARY OF THE INVENTION

The present invention has been made to overcome the conventional drawbacks, and has as its object to add an encryption function of encrypting print information without greatly changing an existing printing environment.

In order to achieve the above object, according to one aspect of the present invention, there is provided an information processing apparatus which encrypts and outputs print job data, comprising:

generation means for generating print job data in accordance with a printing instruction from an application;

encryption means for encrypting the print job data generated by the generation means when encryption of the print job data is designated;

output means for outputting the print job data generated by the generation means or the print job data encrypted by the encryption means; and change means for, when a printing apparatus serving as an output destination to which the encrypted print job data is output does not have a decryption function of decrypting the encrypted print job data, changing the output destination to a decryption apparatus having the decryption function.

According to another aspect of the present invention, there is provided an information processing apparatus which encrypts and outputs print job data, comprising:

generation means for generating print job data in accordance with a printing instruction from an application;

encryption means for encrypting the print job data generated by the generation means when encryption of the print job data is designated; and cancellation means for canceling a print job when designation to save the print job data in a printing apparatus is detected by the encryption means.

According to still another aspect of the present invention, there is provided a method of controlling an information processing apparatus which encrypts and outputs print job data, comprising:

a generation step of generating print job data in accordance with a printing instruction from an application;

an encryption step of encrypting the print job data generated in the generation step when encryption of the print job data is designated;

an output step of outputting the print job data generated in the generation step or the print job data encrypted in the encryption step; and a change step of, when a printing apparatus serving as an output destination to which the encrypted print job data is output does not have a decryption function of decrypting the encrypted print job data, changing the output destination to a decryption apparatus having the decryption function.

According to still another aspect of the present invention, there is provided a method of controlling an information processing apparatus which encrypts and outputs print job data, comprising:

a generation step of generating print job data in accordance with a printing instruction from an application;

an encryption step of encrypting the print job data generated in the generation step when encryption of the print job data is designated; and a cancellation step of canceling a print job when designation to save the print job data in a printing apparatus is detected in the encryption step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a schematic block diagram showing an example of the configuration of a client computer shown in FIG. 14;

FIG. 21 is a view showing an example of the user interface of a tool for generating an install set capable of installing a printer driver with an administrator's public key.

DETAILED DESCRIPTION OF THE PREFERRED EMBODIMENTS

Preferred embodiments of the present invention will be described in detail below with reference to the accompanying drawings.

First Embodiment

Figure 1:
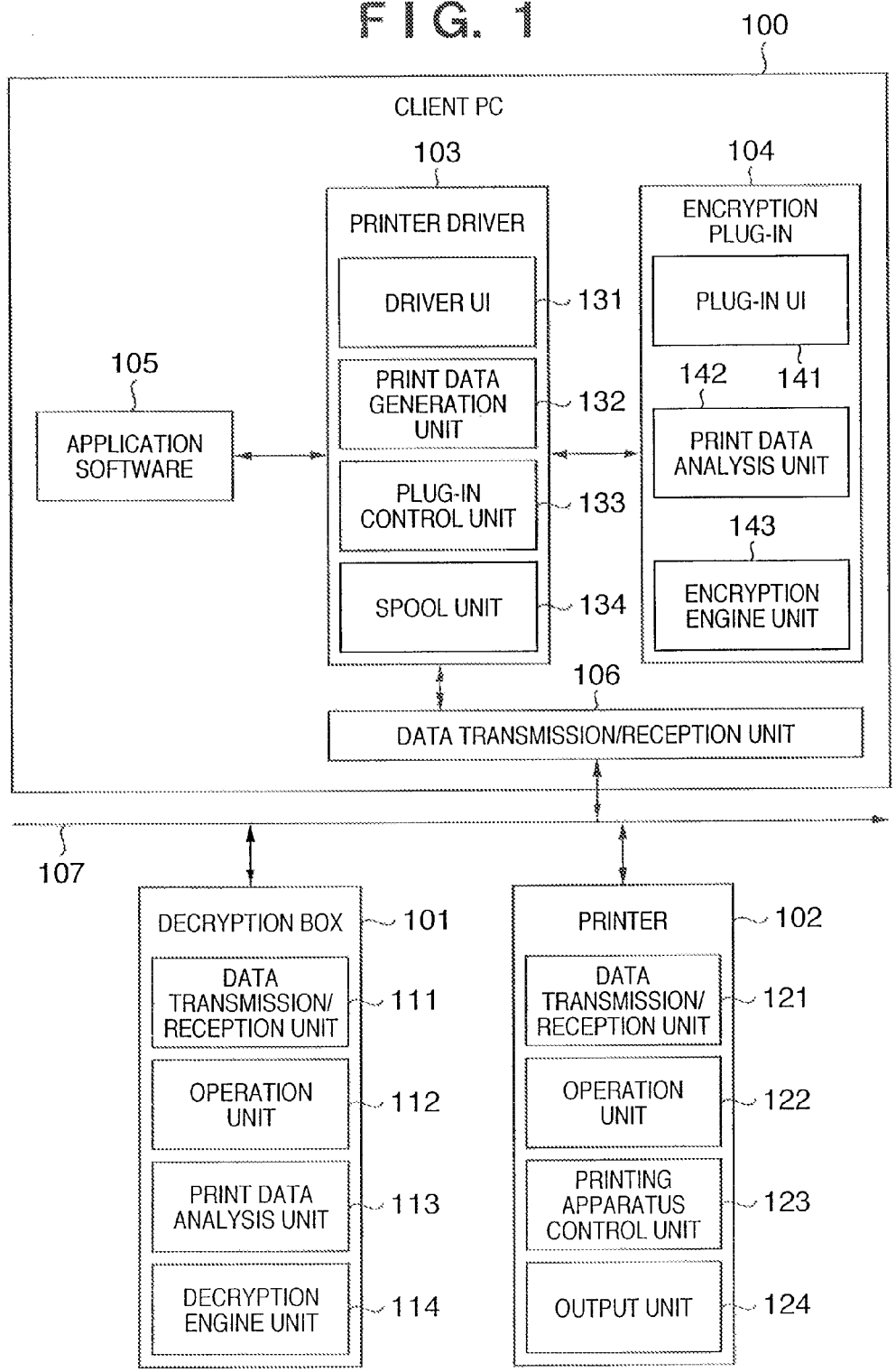
FIG. 1 is a block diagram showing an example of the configuration of a printing system according to the first embodiment.

FIG. 1 is a block diagram showing an example of the configuration of a printing system according to the first embodiment. In the printing system, at least one client PC 100, decryption box 101, and printer 102 are connected to each other via a network 107.

In the first embodiment, the hardware configurations of the client PC 100, decryption box 101, and printer 102 suffice to be general ones, and a description thereof will be omitted. The software configuration will be explained in detail.

In the client PC 100, application software 105 has a role of generating, editing, or processing data, and when the user designates the start of printing, transferring data to be printed to a printer driver 103. The printer driver 103 is installed in each printer connected to the network 107, receives print data sent from the application software 105 via an interface provided by the OS (Operating System), and generates print job data interpretable by a corresponding printer.

The printer driver 103 is formed from a driver UI 131 for making print settings, a print data generation unit 132 which receives print data from the application software 105 and generates print job data for a printer, a plug-in control unit 133 which provides a function-expandable interface for the printer driver 103, and a spool unit 134 which temporarily spools print job data generated by the print data generation unit 132 or print job data processed by a plug-in via the plug-in control unit 133.

The plug-in control unit 133 provides an interface capable of adding a user interface, and an interface for access to print job data generated by the print data generation unit 132.

The client PC 100 also comprises an encryption plug-in 104 which is controlled by the plug-in control unit 133 and encrypts print data. The encryption plug-in 104 is formed from a plug-in UI 141 for setting whether or not to encrypt print data and inputting settings of the encryption plug-in function, a print data analysis unit 142 which analyzes print job data generated by the print data generation unit 132, specifies print data, and determines whether the print job complies with encryption printing, and an encryption engine unit 143 which encrypts print data that is analyzed and extracted by the print data analysis unit 142. The encryption plug-in 104 also detects whether encryption of print job data has been designated.

When save of print data in the printer 102 is designated, the print data analysis unit 142 determines that the print job is incompatible. Encryption of print data by the encryption engine unit 143 will be described in detail later.

Print data encrypted by the encryption plug-in 104 is returned to the printer driver 103 via the plug-in control unit 133.

The client PC 100 also comprises a data transmission/reception unit 106. The data transmission/reception unit 106 exchanges data with the decryption box 101 and the printer 102 via the network 107.

The decryption box 101 receives print job data containing encrypted print data from the client PC 100 connected via the network 107, decrypts the print data, and transmits the decrypted print job data to the printer 102. The decryption box 101 is formed from a data transmission/reception unit 111 which exchanges data with the client PC 100 and printer 102 (to be described later) that are connected via the network 107, an operation unit 112 for inputting a password or the like in decrypting encrypted data, a print data analysis unit 113 which analyzes print job data that is received from the data transmission/reception unit 111 and contains encrypted print data, and extracts the encrypted print data, and a decryption engine unit 114 which decrypts the encrypted print data.

Print data decrypted by the decryption engine unit 114 is transmitted to the printer 102 via the data transmission/reception unit 111 and network 107.

The printer 102 performs print processing or sends back the printing status as a response in accordance with an instruction from the connected client PC 100 via the decryption box 101. The printer 102 is formed from a data transmission/reception unit 121 which exchanges data with the client PC 100 and decryption box 101 that are connected via the network 107, an operation unit 122 for making print settings, a printing apparatus control unit 123 which analyzes print job data received via the data transmission/reception unit 121 and generates a print page, and an output unit 124 which prints out a print page generated by the printing apparatus control unit 123.

The flow of encrypted print data in encrypting, by the encryption plug-in 104, print data to be transferred from the printer driver 103 of the client PC 100 to the printer 102, and outputting the encrypted print data to a decryption-incompatible printer 102 will be explained in comparison with the flow of conventional unencrypted print data.

Figure 2:
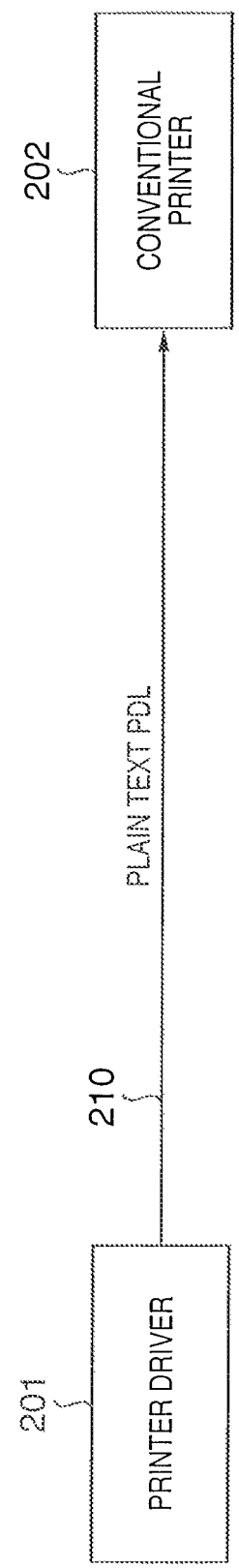
FIG. 2 is a block diagram showing an example of the configuration of a printing system which does not encrypt print data.

FIG. 2 is a block diagram showing an example of the configuration of a printing system which does not encrypt print data. As shown in FIG. 2, the printing system comprises a printer driver 201 and conventional printer 202. PDL (Page Description Language) data generated by the printer driver 201 is transferred as a plain text via a network 210.

Figure 3:
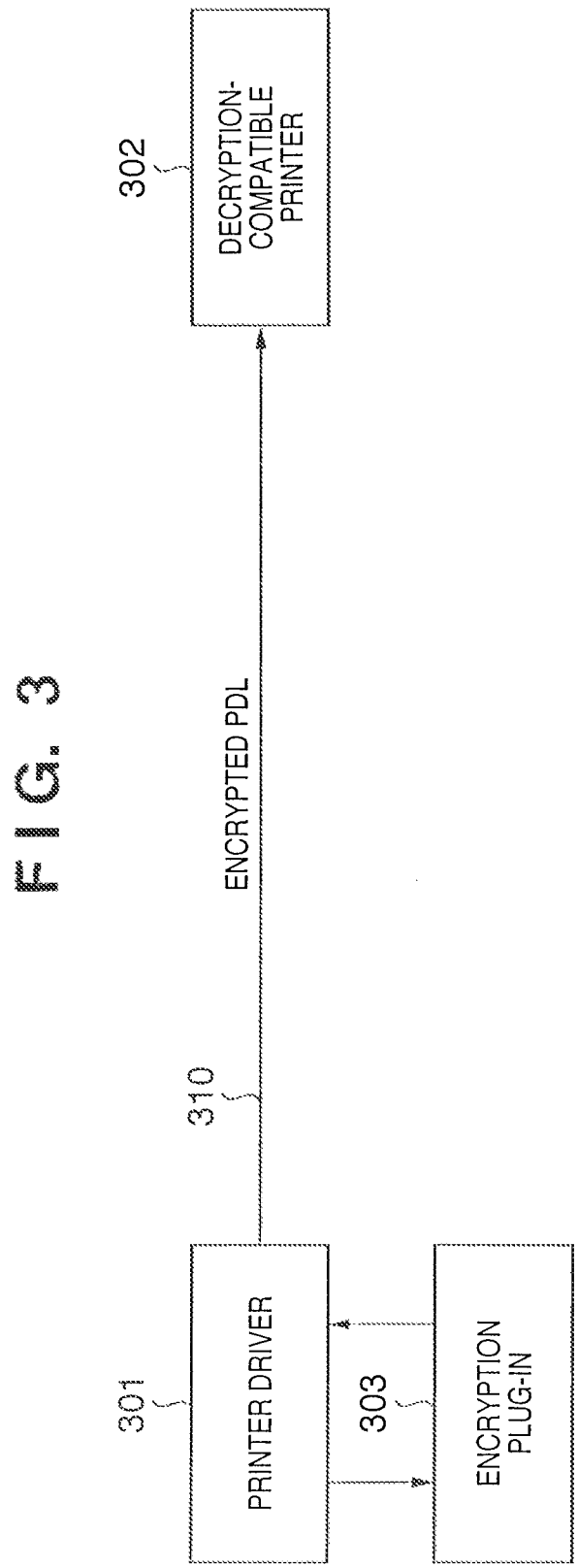
FIG. 3 is a block diagram showing an example of the configuration of a printing system in a typical encryption printing environment.

FIG. 3 is a block diagram showing an example of the configuration of a printing system in a typical encryption printing environment. As shown in FIG. 3, an encryption plug-in 303 provides a printer driver 301 with a function of encrypting PDL data. The printer driver 301 is connected to a printer 302 having a decryption function, and encrypted PDL data is transferred via a network 310.

Figure 4:
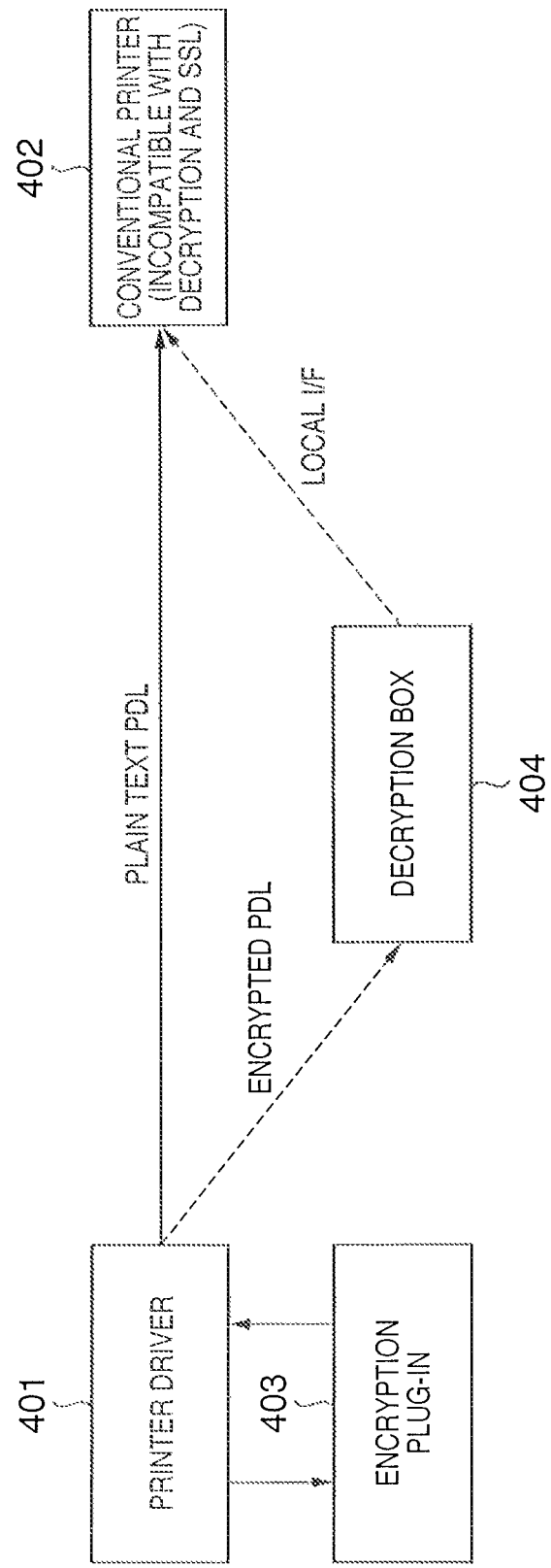
FIG. 4 is a block diagram showing the flow of print data in the printing system shown in FIG. 1.

FIG. 4 is a block diagram showing the flow of print data in the printing system shown in FIG. 1. In this example, encryption printing is done using a (decryption-incompatible) printer 402 having no decryption function. In an environment where a printer driver 401 and the printer 402 are connected, an encryption plug-in 403 provides the printer driver 401 with a function of encrypting PDL data, and a decryption box 404 having a decryption function is interposed between the printer driver 401 and the printer 402. The data destination of the printer driver 401 is changed from the printer 402 to the decryption box 404, and encrypted print data is transmitted.

The decryption box 404 decrypts print job data containing received/encrypted print data, and transmits the resultant print job data as print job data of a plain text to the printer 402. In the example shown in FIG. 4, the printer 402 does not support SSL encryption communication. The decryption box 404 and printer 402 are connected by a local interface such as a USB to protect print data from eavesdropping.

Figure 5:
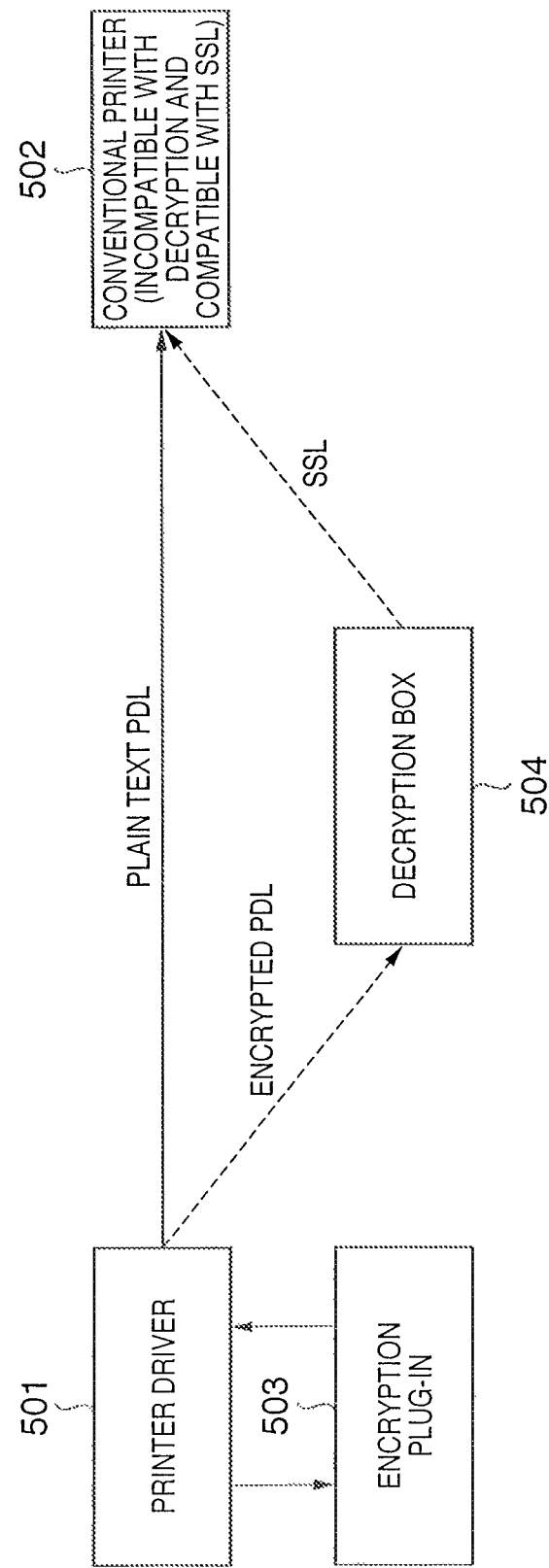
FIG. 5 is a block diagram showing the flow of print data in a printing system similar to FIG. 4.

FIG. 5 is a block diagram showing the flow of print data in a printing system similar to FIG. 4. In the example shown in FIG. 5, a printer 502 supports SSL encryption communication. Encrypted print job data is communicated between a decryption box 504 and the printer 502 by SSL communication using a network.

The configuration of a printing system when print job data containing encrypted print data is transferred to a decryption-compatible printer will be explained.

Figure 6:
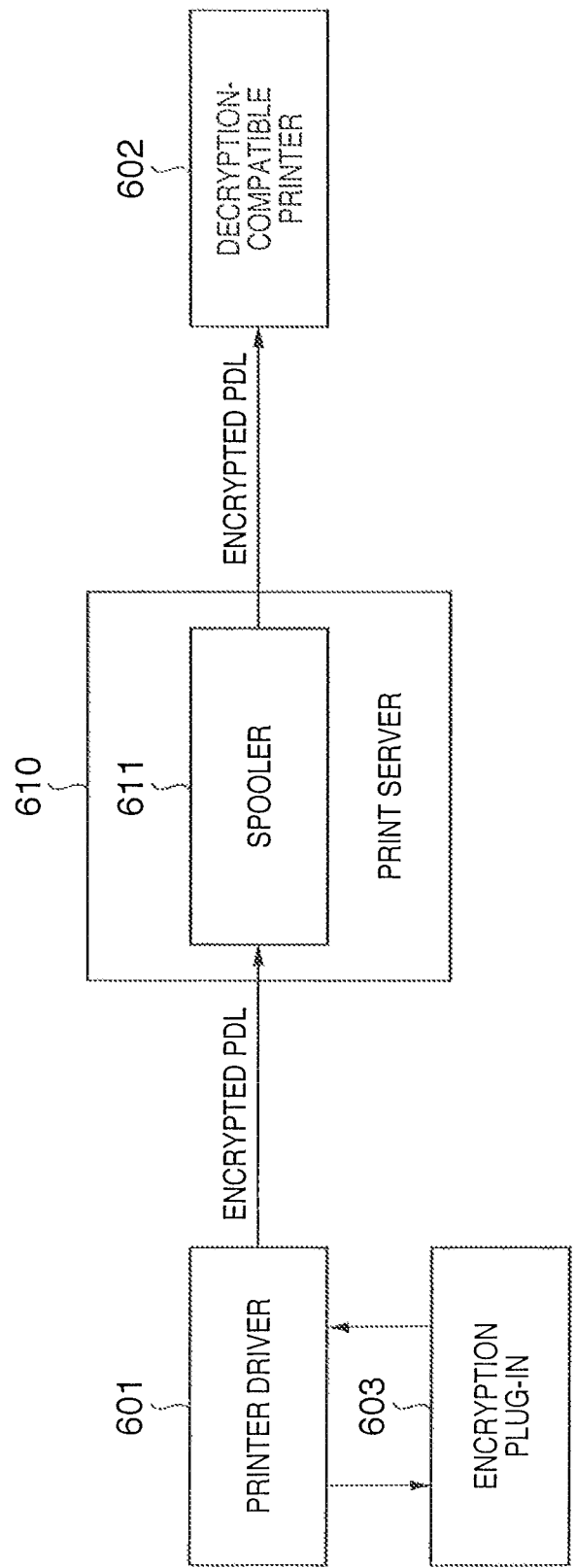
FIG. 6 is a block diagram showing an example of the configuration of a printing system using a printer server.
Figure 7:
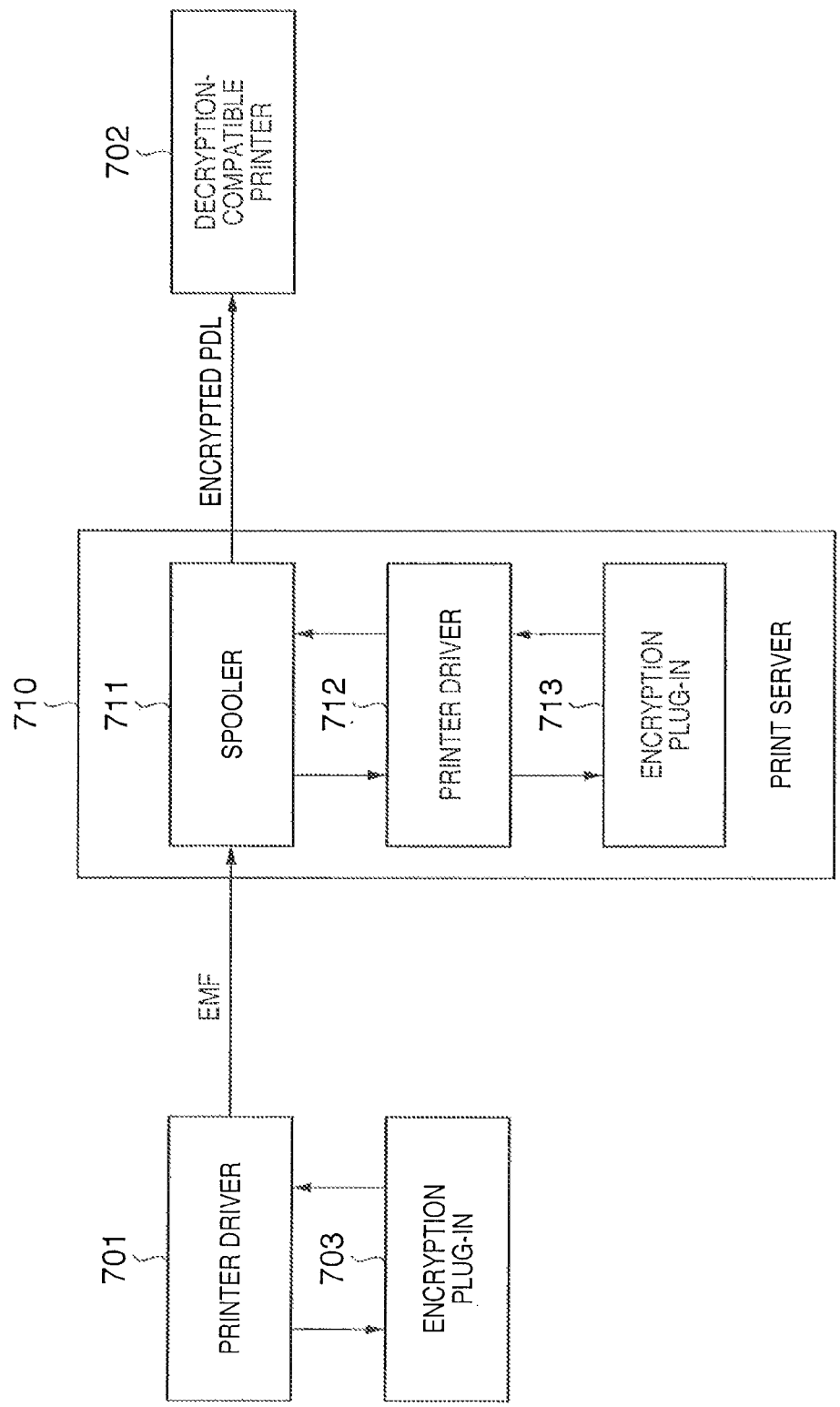
FIG. 7 is a block diagram showing another example of the configuration of the printing system using the printer server.

FIGS. 6 and 7 are block diagrams showing examples of the configuration of a printing system using a printer server. In the example shown in FIG. 6, a printer driver 601 of a client PC generates encrypted PDL data, and transmits print job data to a print server 610. The print server 610 transfers the print job data to a printer 602 having a decryption function or to the printer via a decryption box, thereby realizing encryption printing.

In the example shown in FIG. 7, print processing on the client PC side selects a printing method using spooling in an abstracted meta file format (e.g., for Windows®, an EMF file). In this case, print data of the meta file format is transferred to a print server 710, and encrypted by an encryption plug-in 713 in the print server 710. That is, information corresponding to print data of a plain text is undesirably exchanged between a printer driver 701 of the client PC and the print server 710.

To solve this problem, according to the first embodiment, the printing method is forcibly switched to a method which dose not perform meta file spooling even when a printing method using spooling in an abstracted meta file format is selected in print processing on the client PC side.

Figure 8:
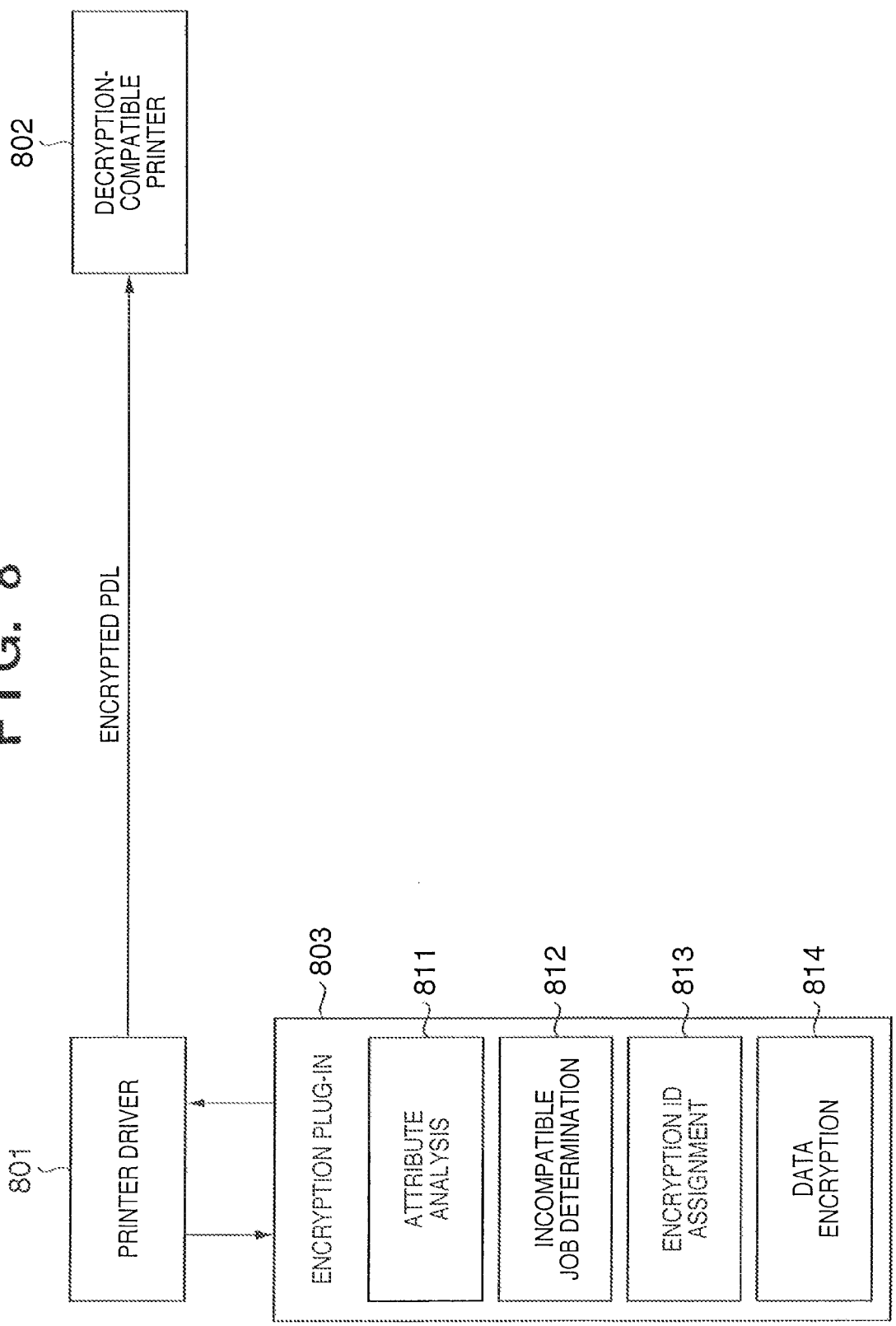
FIG. 8 is a block diagram showing an example of the configuration of an encryption plug-in in the printing system.

FIG. 8 is a block diagram showing an example of the configuration of an encryption plug-in in the printing system. In FIG. 8, an encryption plug-in 803 executes internal processing of encrypting print job data generated by a printer driver 801. For this purpose, a print data analysis unit analyzes print job data, and an incompatible job determination unit 812 determines whether the print job is properly subjected to encryption printing. For example, when print job data designates save of print data in the printer, the print job is determined not to be proper, and the print job is canceled.

This prevents leakage of data after decrypting encrypted data because data is saved in a printer 802 without any encryption in print data save processing. When the print job is proper as a result of analyzing print job data, not the job attribute but only the print data body is extracted, and encrypted by a data encryption unit 814. An encryption ID assignment unit 813 assigns the encrypted data an identifier (ID) representing that the data has been encrypted. After that, when encrypted print job data is decrypted by the decryption box or decryption-compatible printer 802, decryption processing is performed by referring to the identifier representing that data has been encrypted.

Figure 9:
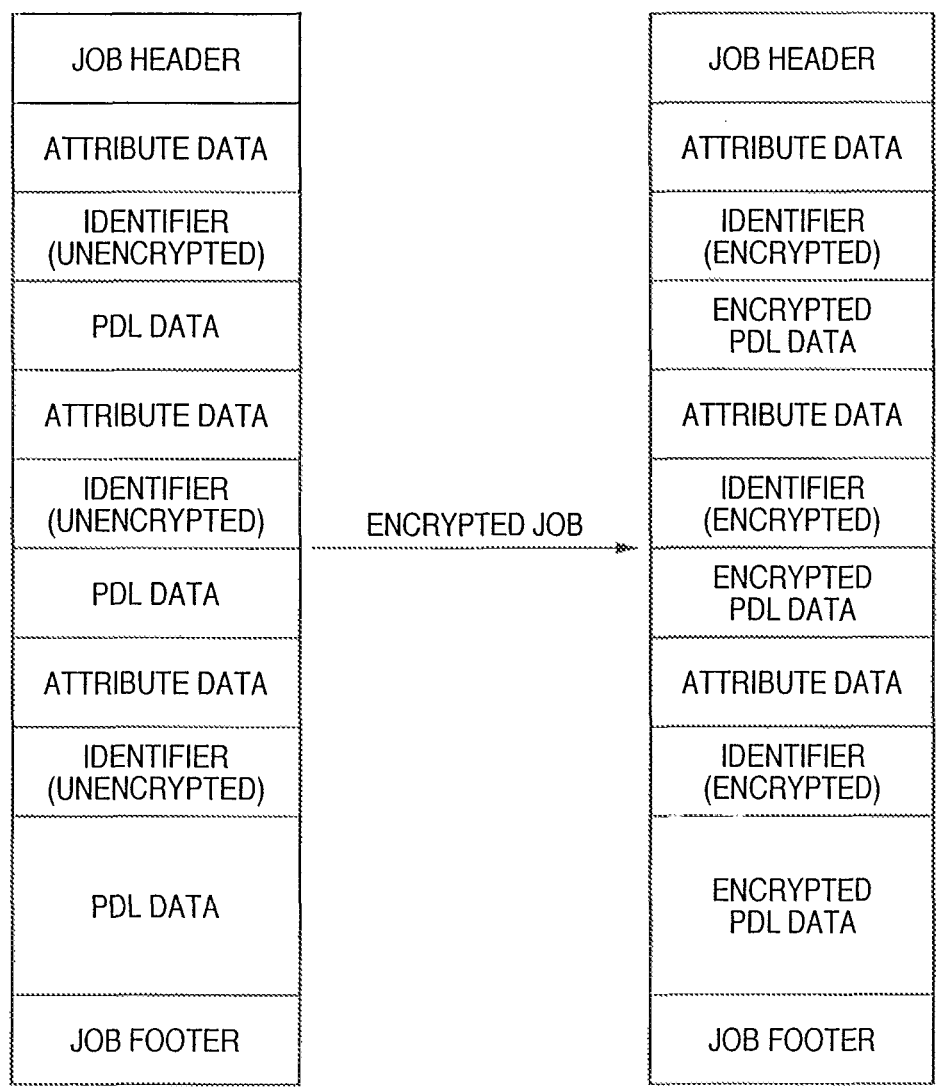
FIG. 9 is a view showing an example of the data structure of an encrypted job in the printing system.

FIG. 9 is a view showing an example of the data structure of an encrypted job in the printing system. Left data shown in FIG. 9 is print job data representing an unencrypted state. Print job data is sandwiched between a job header information field and a job footer information field, and is made up of combinations each of attribute data, an identifier representing an unencrypted state, and PDL data of a plain text.

When a PDL data field is specified in analysis processing by the print data analysis unit 142 of the encryption plug-in 104, the encryption engine unit 143 encrypts PDL data. Right data shown in FIG. 9 represents that PDL data is replaced with encrypted PDL data and an identifier representing that the PDL data has been encrypted is added.

Processing of installing the encryption plug-in 104 (encryption plug-in module) in the client PC 100 shown in FIG. 1 will be explained.

Figure 10:
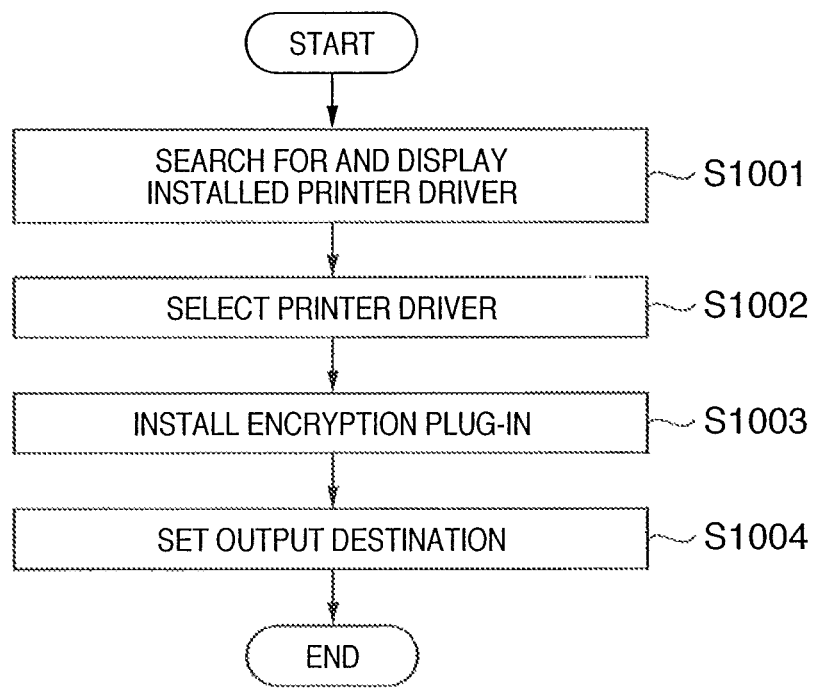
FIG. 10 is a flowchart showing processing of installing an encryption plug-in module.

FIG. 10 is a flowchart showing processing of installing an encryption plug-in module. The client PC 100 starts installation processing, and the flow advances to step S1001. Installed printer drivers are searched for, it is determined whether the encryption plug-in module can be installed, and installable printer drivers are displayed in the user interface window. Whether a searched printer driver supports the encryption plug-in module is determined by whether the printer driver has the plug-in control unit 133 shown in FIG. 1. If a printer driver supports the encryption plug-in module, the printer driver is displayed in the user interface window.

In step S1002, the user is prompted to select one of printer drivers to be installed from the user interface window. In step S1003, the encryption plug-in module is installed in correspondence with the selected printer driver. Note that the encryption plug-in module is acquired by loading it from a CD-ROM or DVD, or downloading it from a predetermined distribution site via the network 107.

In step S1004, the output destination setting of a printer in the printer driver in which the encryption plug-in module is installed is correctly reset. If the printer supports decryption (see FIG. 3), the output destination is not changed. If the printer does not support decryption (FIGS. 4 and 5), the output destination is reset to the decryption box 101 (404 or 504) connected between the printer driver and the printer. Thereafter, installation processing ends.

Figure 11:
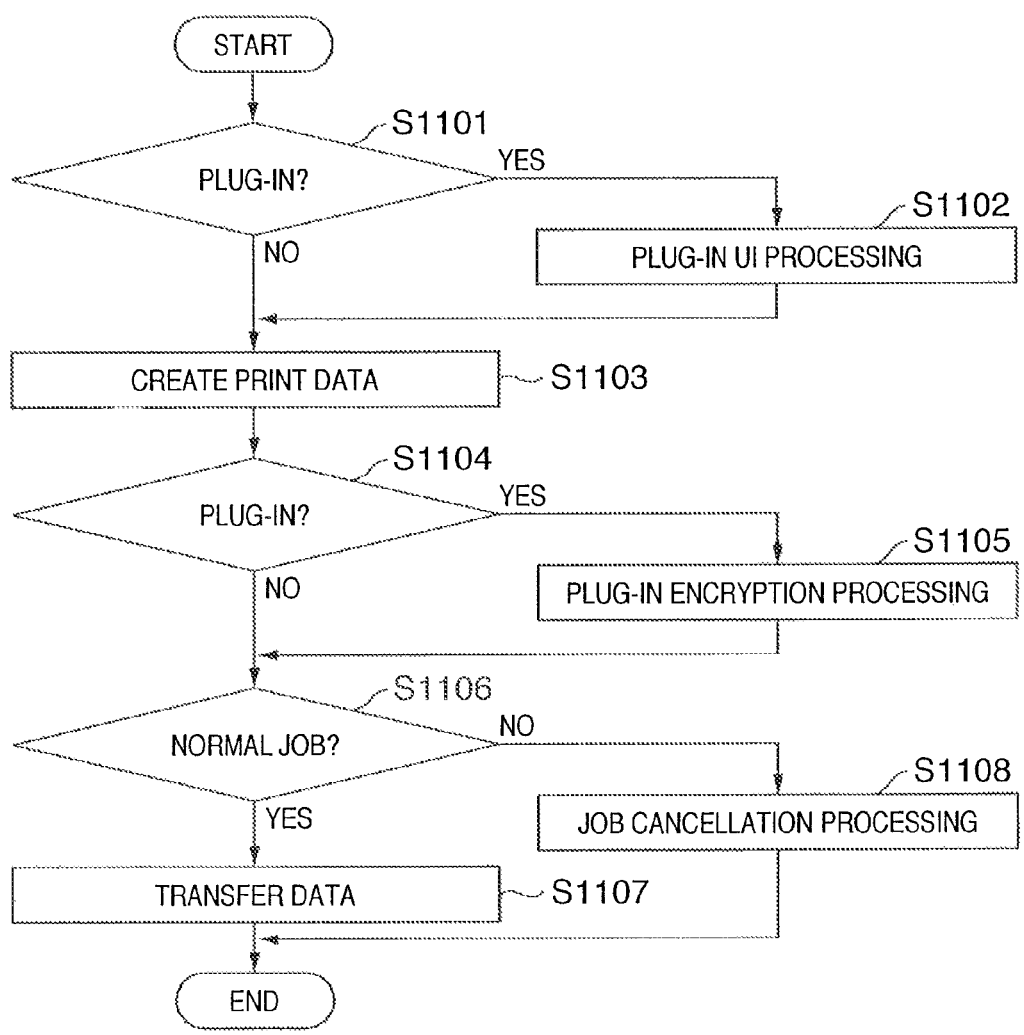
FIG. 11 is a flowchart showing processing of a printer driver 103 in the printing system.

FIG. 11 is a flowchart showing processing of the printer driver 103 in the printing system. The application software 105 designates the start of printing, and requests the print data generation unit 132 of the printer driver 103 to generate a print job. The flow advances to step S1101, and the plug-in control unit 133 determines whether the encryption plug-in 104 has already been installed. If YES in step S1101, the flow advances to step S1102, and the plug-in UI 141 of the encryption plug-in 104 is invoked to execute plug-in UI processing. If NO in step S1101, the flow advances to step S1103.

Plug-in UI processing in step S1102 will be described in detail later with reference to FIG. 12.

In step S1103, the print data generation unit 132 receives print data from the application software 105 via the interface of the OS, and generates print job data interpretable by the printer 102 from the print data. In step S1104, it is determined whether the encryption plug-in 104 has been installed. If YES in step S1104, the flow advances to step S1105, and the print data analysis unit 142 and encryption engine unit 143 of the encryption plug-in 104 are invoked to execute plug-in encryption processing. If NO in step S1104, the flow advances to step S1106.

Plug-in encryption processing in step S1105 will be described in detail later with reference to FIG. 13.

In step S1106, it is determined whether a print job has normally been created. If YES in step S1106, the flow advances to step S1107 to transmit the print job data to a set output destination. If NO in step S1106, the flow advances to step S1108 to perform job cancellation processing.

Print job data generation processing by the printer driver 103 according to the first embodiment has been described.

Figure 12:
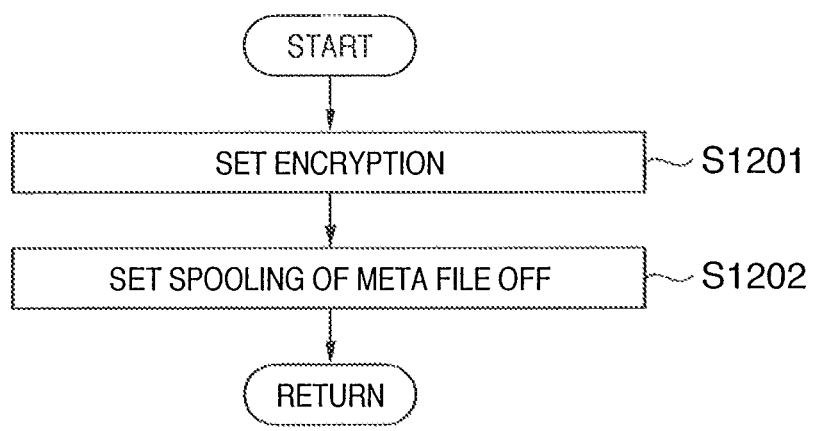
FIG. 12 is a flowchart showing details of plug-in UI processing (S1102 in FIG. 11)

FIG. 12 is a flowchart showing details of plug-in UI processing (S1102 in FIG. 11). When the plug-in control unit 133 of the printer driver 103 invokes the plug-in UI 141 of the encryption plug-in 104, the flow advances to step S1201 to display a user interface window for setting whether or not to encrypt print data and prompt the user to make a setting. In step S1202, meta file spool processing by the printer driver 103 is set OFF, and the flow returns to an invoking routine.

Figure 13:
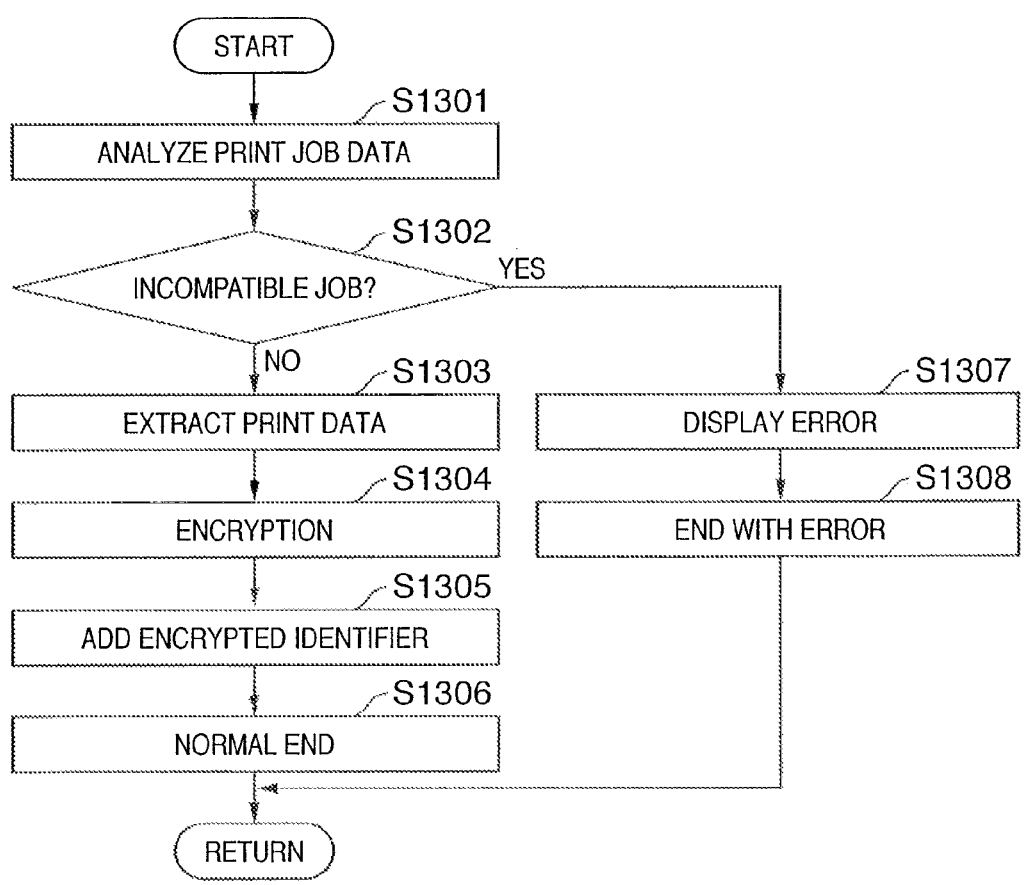
FIG. 13 is a flowchart showing details of plug-in encryption processing (S1105 in FIG. 11)

FIG. 13 is a flowchart showing details of plug-in encryption processing (S1105 in FIG. 11). When the print data analysis unit 142 and encryption engine unit 143 are invoked, similar to the UI 141 of the encryption plug-in 104, the flow advances to step S1301, and the print data analysis unit 142 analyzes print job data generated by the printer driver 103. In step S1302, it is determined whether the print job is incompatible with encryption printing. In the first embodiment, data representing save of print data in the printer 102 is determined to be incompatible with encryption printing.

If the job is determined in step S1302 not to be incompatible, the flow advances to step S1303 to extract print data from the print job. The print job generally contains a control code and the like which do not influence a print result, and such data is not encrypted in the first embodiment.

The encryption engine unit 143 encrypts the extracted print data in step S1304, and adds in step S1305 an identifier representing that the print data has been encrypted. In step S1306, the flow returns to an invoking routine in response to a return value representing normal end.

A method of encrypting print data may be a known encryption method such as a common key method or public key method, and a description thereof will be omitted.

If the job is determined in step S1302 to be incompatible, the flow advances to step S1307 to present an error display. In step S1308, the flow returns to an invoking routine in response to a return value representing an error end.

As described above, according to the first embodiment, the encryption function of encrypting print information can be added by installing an encryption plug-in module without greatly changing an existing printing environment.

Second Embodiment

The second embodiment according to the present invention will be described in detail below with reference to the accompanying drawings.

Recently, IC cards have prevailed, and there is also proposed a mechanism in which processing of simplifying input of a personal identification number or password by using an ID card is realized using an IC card.

As the performance of IC cards improves, the above-described encryption itself can be achieved by the IC card. There is also proposed a more secure method which basically inhibits decryption in the absence of an IC card used for encryption.

In confidential printing using a conventional IC card, decryption is generally permitted for only an IC card used for encryption. When the user loses his IC card, he cannot print. Furthermore, when the administrator is to audit a printed material, he cannot audit it because data cannot be decrypted.

A purpose of the second embodiment is to allow decrypting a print job even with an administrator's IC card in addition to a user's IC card.

Figure 14:
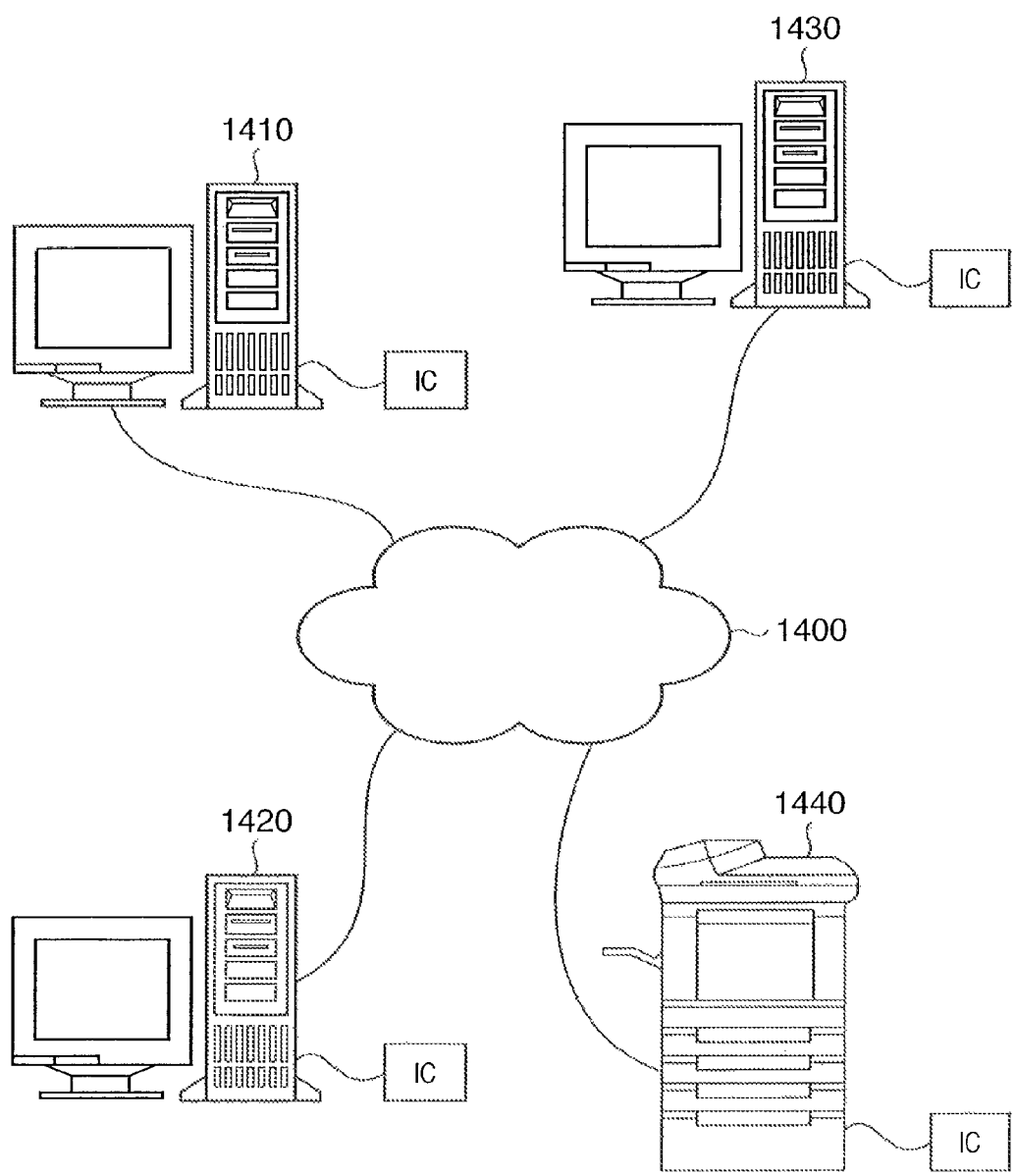
FIG. 14 is a view showing an example of the configuration of a printing system according to the second embodiment.

FIG. 14 is a view showing an example of the configuration of a printing system according to the second embodiment. In FIG. 14, reference numeral 1400 denotes a communication network which supports, e.g., a TCP/IP protocol. Reference numerals 1410 and 1420 denote information processing apparatuses which are client computers used by general users. Reference numeral 1430 denotes an information processing apparatus which is a management server computer. Reference numeral 1440 denotes an image forming apparatus which is a multifunction peripheral having a plurality of functions.

In this configuration, an electronic document created by an application in, e.g., the client computer 1410 is encrypted with a connected IC card, and transmitted to the multifunction peripheral 1440. Immediately after receiving the encrypted print data, the multifunction peripheral 1440 does not print, and temporarily saves the encrypted print data. When the user comes to the multifunction peripheral 1440 and sets his IC card, the multifunction peripheral 1440 decrypts the saved/encrypted print job and starts printing.

This configuration is merely a conceptual diagram of a general configuration, and pluralities of computers and multifunction peripherals used by general users may be adopted. The multifunction peripheral is not always necessary, and single devises such as a scanner, printer, and FAX apparatus may be connected to a network.

Figure 15:
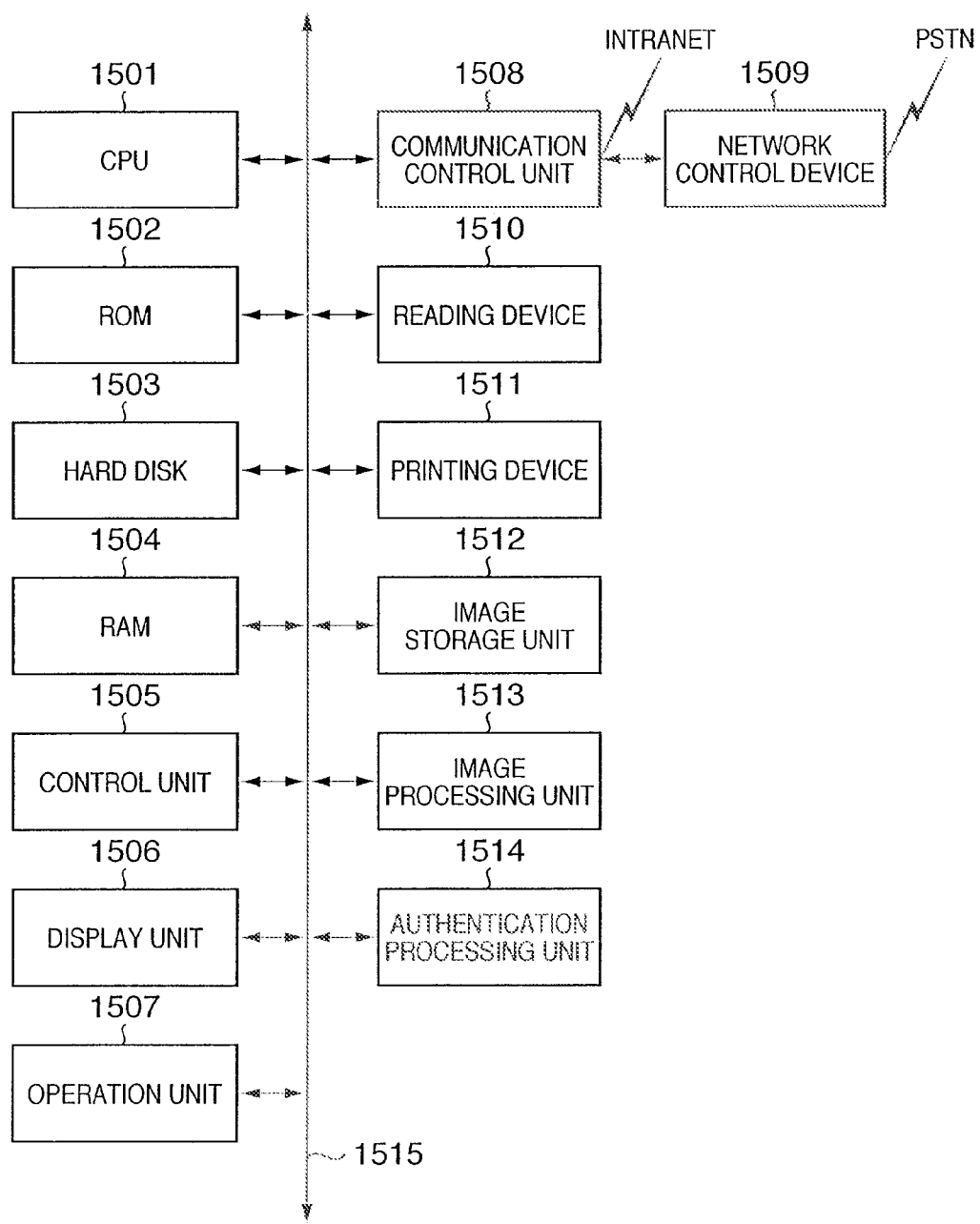
FIG. 15 is a schematic block diagram showing an example of the configuration of a multifunction peripheral shown in FIG. 14.

FIG. 15 is a schematic block diagram showing an example of the configuration of the multifunction peripheral shown in FIG. 14. A CPU (Central Processing Unit) 1501 shown in FIG. 15 executes various functions and various processes (to be described later) according to the second embodiment together with a control unit 1505 by using a RAM (Random Access Memory) 1504 in accordance with a control program read out from a ROM (Read Only Memory) 1502 or hard disk 1503. The RAM 1504 stores various types of information such as the driving conditions and management data of respective units of the apparatus, and stores data necessary for operation.

A display unit 1506 displays various types of information such as the driving condition, apparatus state, and input information. An operation unit 1507 includes keys (e.g., a ten-key pad and start key) for inputting settings, instructions, and the like from the user, and a touch panel which is partially provided on the display unit 1506.

A communication control unit 1508 connects a network such as an intranet or the Internet, and executes transmission/reception of document data containing image data and control commands. A network control device 1509 connects a PSTN (Public Switched Telephone Network), and in originating or receiving a call, executes predetermined line control to connect Or disconnect the line. Image data and control signals are modulated/demodulated by an internal modem device, and facsimile transmission/reception is executed via the network control device 1509.

A reading device 1510 reads image data by photoelectrically converting reflected light corresponding to an image of light which irradiates a document to be transmitted, copied, or saved. A printing device 1511 forms read or received image data or received print data as a permanent visible image on a print sheet, and outputs the print sheet.

An image storage unit 1512 temporarily stores read or received image data and received print data. The image storage unit 1512 may be ensured in the hard disk 1503 depending on the device or state.

An image processing unit 1513 performs various processes in accordance with a request. That is, the image processing unit 1513 compresses and encodes image data to be transmitted, or decompresses and decodes received image data. The image processing unit 1513 converts received print data into image data, or converts image data to be saved into a proper format or format designated by the user (e.g., PDF format). The image processing unit 1513 performs image correction processing in accordance with the optical response characteristic of the reading device 1510, variations in sensor, or the like, performs image processing such as scaling processing of an image input by the user from the operation unit 1507, or performs image optimization processing for image data that is suitable for the write characteristic of the printing device 1511 or the like.

An authentication processing unit 1514 performs print job authentication in addition to user authentication. A bus 1515 connects the CPU 1501, ROM 1502, hard disk 1503, RAM 1504, control unit 1505, display unit 1506, operation unit 1507, communication control unit 1508, reading device 1510, printing device 1511, image storage unit 1512, image processing unit 1513, and authentication processing unit 1514 to each other.

In this manner, the multifunction peripheral 1440 comprises a facsimile communication function of transmitting read image data, a transfer function of transferring data to the document management server computer 1430, a copying function of printing out read image data, a reception/printing function of FAX-receiving received image data, and a printing function of receiving and printing print data from the client computer 1410 or 1420. The multifunction peripheral 1440 can be so configured as to be used as not only a copying apparatus but also a facsimile apparatus, printer, and scanner.

A storage medium control unit has a user authentication function of, when a magnetic card holding, e.g., a department number and password is inserted, reading out a preset department number and password from the ROM 1502 or hard disk 1503, performing authentication by the authentication processing unit 1514, and then implementing various functions.

Instead of using a magnetic card, the user may be prompted to input a department number and password from the operation unit 1507, and the authentication processing unit 1514 may authenticate the user.

In addition to an electrophotographic method, the printing device 1511 may employ another printing method such as an inkjet method, thermal head method, or dot impact method.

FIG. 16 is a schematic block diagram showing an example of the configuration of the client computer shown in FIG. 14. In FIG. 16, the client computer comprises a CPU 1601 which executes a program stored in a ROM 1602 or hard disk (HD) 1610 or supplied from a Floppy® disk drive (FD) 1609. The CPU 1601 comprehensively controls devices connected to a system bus 1604.

Reference numeral 1603 denotes a RAM which functions as a main memory, work memory, and the like for the CPU 1601. Reference numeral 1608 denotes a keyboard controller (KBC) which controls instruction inputs from a keyboard (KB) 1612, pointing device (not shown), and the like. Reference numeral 1607 denotes a CRT controller (CRTC) which controls display on a CRT display (CRT) 1611. Reference numeral 1606 denotes a disk controller (DKC) which controls access to the hard disk (HD) 1610 and Floppy® disk (FD) 1609 that store a boot program, various applications, edit files, user files, an installation program creating program, and the like. Reference numeral 1605 denotes a host interface (I/F) which exchanges data in two ways with a local printer, network printer, another network device, or another PC.

Processing when the client computer generates print data in, encrypts the print data by common key encryption, and transmits the encrypted data to the multifunction peripheral (printing apparatus) will be explained.

Figure 17:
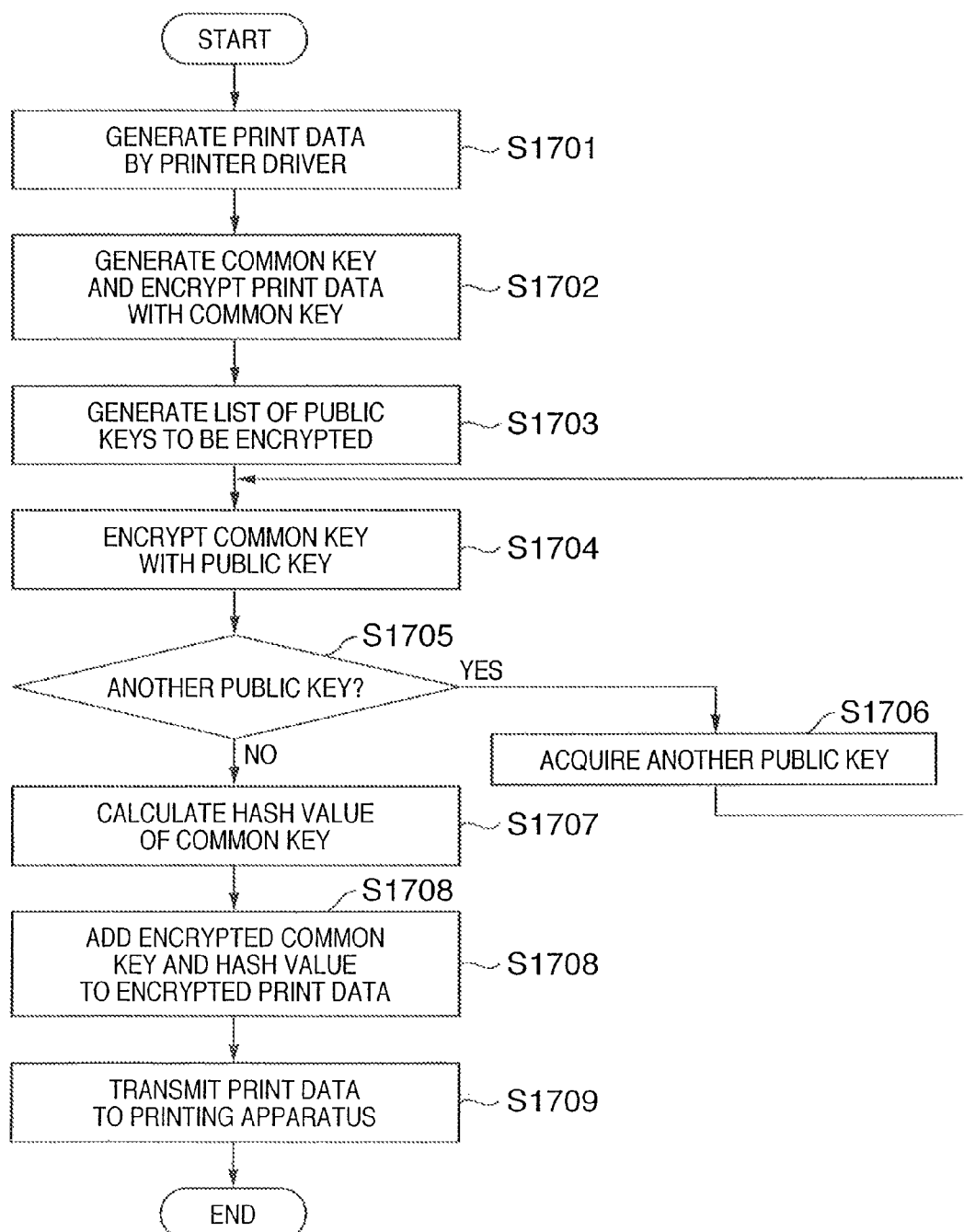
FIG. 17 is a flowchart showing a series of processing procedures in the client computer.

FIG. 17 is a flowchart showing a series of processing procedures in the client computer. Print data is generated by the printer driver in the printing client computer in step S1701, and the generated print data is encrypted in step S1702. Encryption of print data is realized by various methods, and the second embodiment employs the common key method. A common key can also be generated by various methods, and for example, a random number is generated and used as a common key.

In step S1703, in order to enable a plurality of users to decrypt print data, a list of public keys for encrypting a common key is generated on the basis of the fact that a common key can be decrypted with private keys corresponding in number to public keys. A common key is encrypted because encryption of print data becomes insignificant when a common key necessary to decrypt print data is added as a plain text to a print job. If a plurality of users can decrypt a common key, this means that a plurality of users can decrypt print data.

Encryption of a common key is also realized by various methods, and the second embodiment employs the common key method. When a plurality of users can decrypt print data, for example, the administrator prints for an audit, and in addition, he asks his secretary to go for a printed material. In most cases, the user is quite unlikely to add an administrator's key to the list, and the key is preferably automatically added. The choice depends on practical use, and the key may not be automatically added. A public key may be acquired directly from an IC card, or via a certificate, certificate authority, or server, and any method can be adopted.

In step S1704, one public key is acquired from the list generated in step S1703, and the common key is encrypted. In step S1705, it is determined whether to encrypt the common key with another public key in order to enable decryption with a plurality of private keys. If the common key needs to be encrypted with another public key, the flow advances to step S1706 to acquire another public key, and returns to step S1704. If the common key need not be encrypted with another public key, the flow advances to step S1707 to calculate the hash value of the common key as data for confirming whether decryption has correctly been done on the receiving side.

In step S1708, one or more encrypted common keys and their hash values are added to the encrypted print data. In step S1709, the print data is transmitted to the printing apparatus.

Processing when the multifunction peripheral (printing apparatus) receives encrypted print data, common key, and a hash value from a client computer, decrypts print data by using the common key and hash value, and outputs the decrypted print data will be explained.

Figure 18:
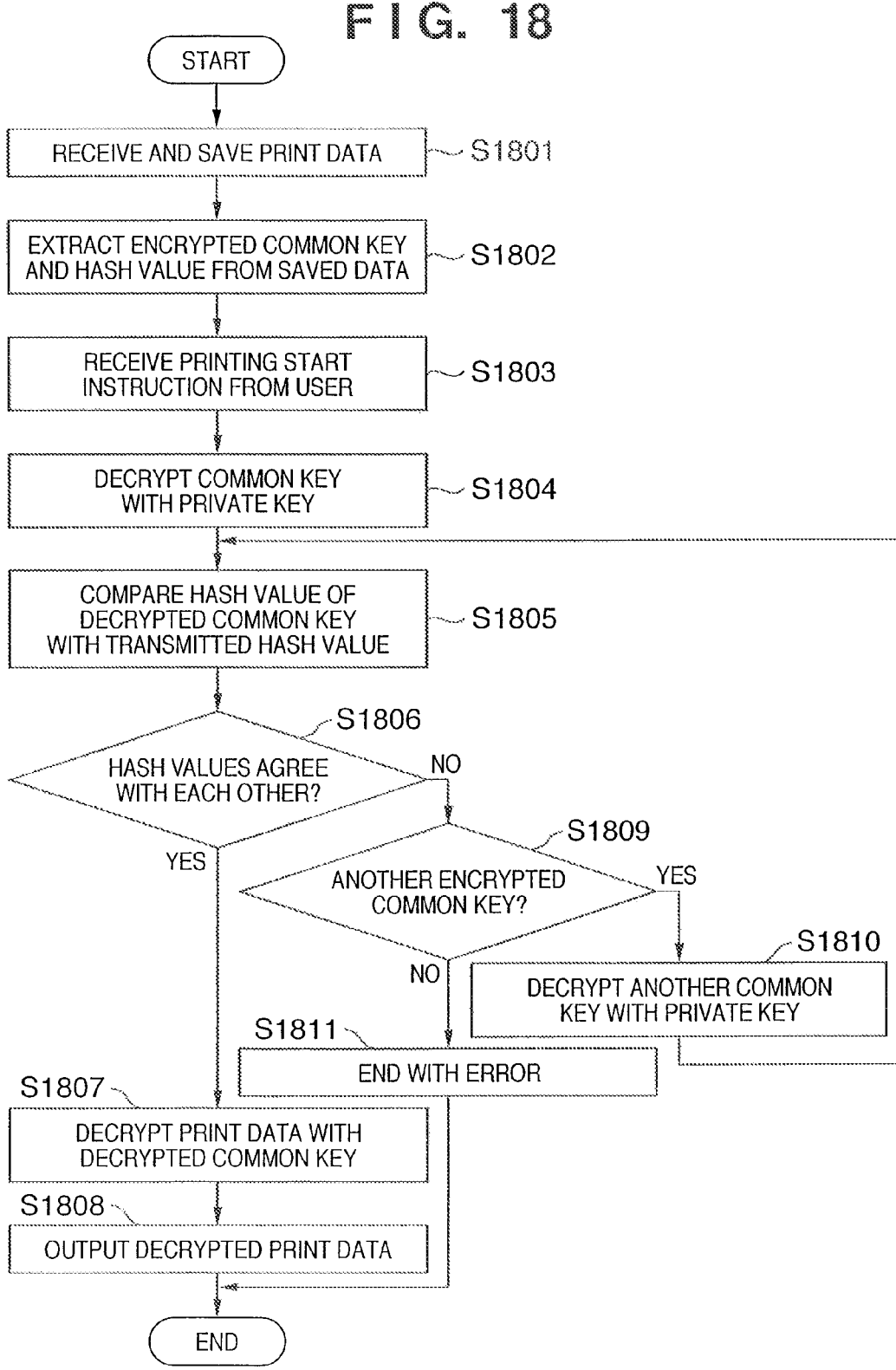
FIG. 18 is a flowchart showing a series of processing procedures in a printing apparatus.

FIG. 18 is a flowchart showing a series of processing procedures in the printing apparatus. In step S1801, encrypted print data transmitted from the client computer is received and temporarily saved in the printing apparatus. In step S1802, an encrypted common key and its hash value are acquired as decryption information from the saved print data.

If a printing start instruction is issued in step S1803, the flow advances to step S1804 to decrypt the encrypted common key with a private key given at the start of printing. As an example of the printing start instruction, an IC card may be inserted into the printing apparatus.

More specifically, when the printing user inserts an IC card, the encrypted common key is decrypted with a private key held in the IC card. In particular, the latest IC card can perform decryption within it using a dedicated coprocessor, and thus is more secure without leaking any private key outside from the IC card.

In step S1805, the hash value of the decrypted common key is calculated and compared with the hash value acquired from the print data. If these hash values agree with each other in step S1806, it is determined that the common key has correctly been decrypted, and the flow advances to step S1807 to decrypt the print data with the decrypted common key. In step S1808, the decrypted print data is output.

If these hash values disagree with each other in step S1806, it is determined that the common key was not correctly decrypted, and the flow advances to step S1809 to check whether another encrypted common key is added to the print data. If another encrypted common key is added, the flow advances to step S1810 to decrypt the common key with the private key, and returns to step S1805. If no other encrypted common key is added, the flow advances to step S1811 and ends with an error because the transmitted/encrypted print data cannot be decrypted with the obtained private key.

Figure 19:
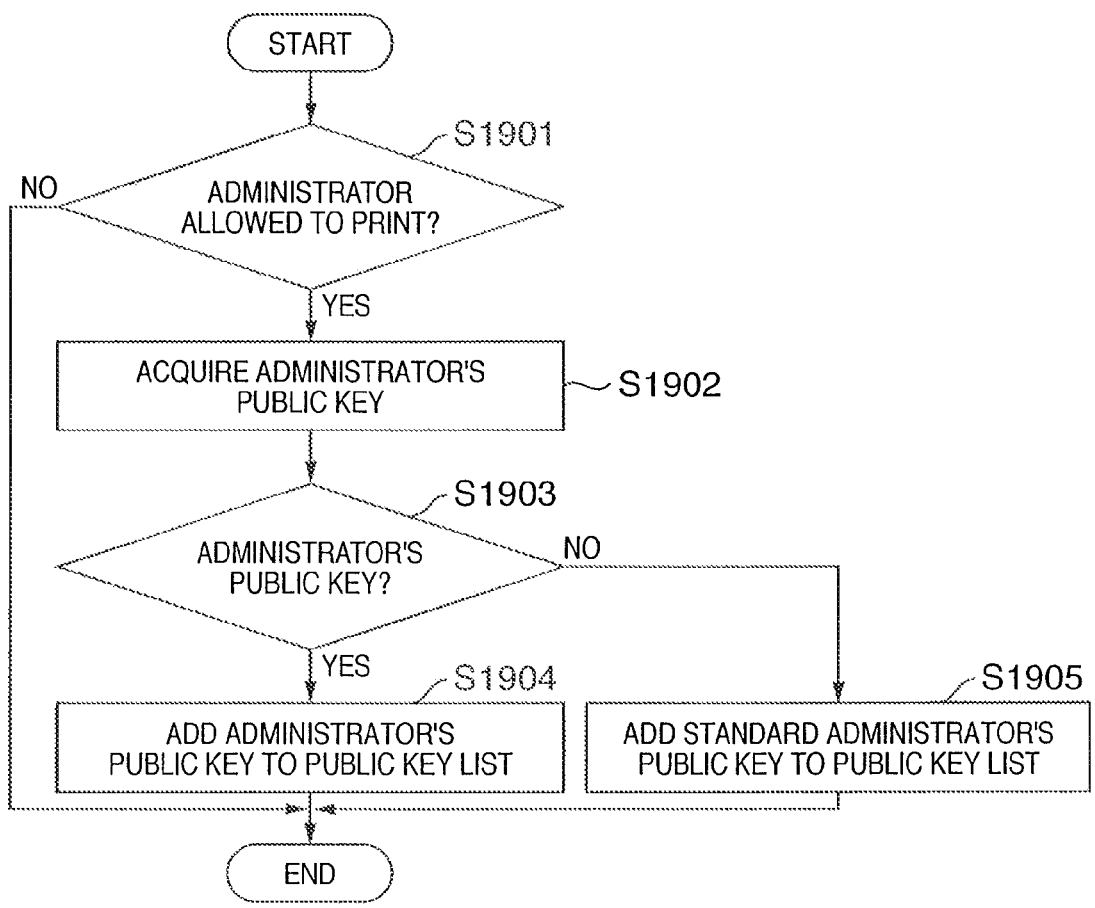
FIG. 19 is a flowchart showing details of processing (S1703 in FIG. 17) of automatically adding an administrator's public key.

FIG. 19 is a flowchart showing details of processing (S1703 in FIG. 17) of automatically adding an administrator's public key: In step S1901, it is checked whether settings which allow the administrator to print at any time have been made. Depending on practical use, confidentiality needs to be protected even by inhibiting an audit by the administrator. In such a case, settings which allow the administrator to print at any time have not been made, and the flow ends without automatically adding the administrator's public key to a public key list.

If settings which allow the administrator to print at any time have been made, the flow advances to step S1902 to acquire the administrator's public key. In step S1903, it is determined whether the administrator's public key has correctly been acquired. If the administrator's public key has correctly been acquired, the flow advances to step S1904 to add the acquired administrator's public key to the public key list.

If no administrator's public key has been acquired, the flow advances to step S1905 to prepare a standard administrator's public key and add it to the public key list.

Figure 20:
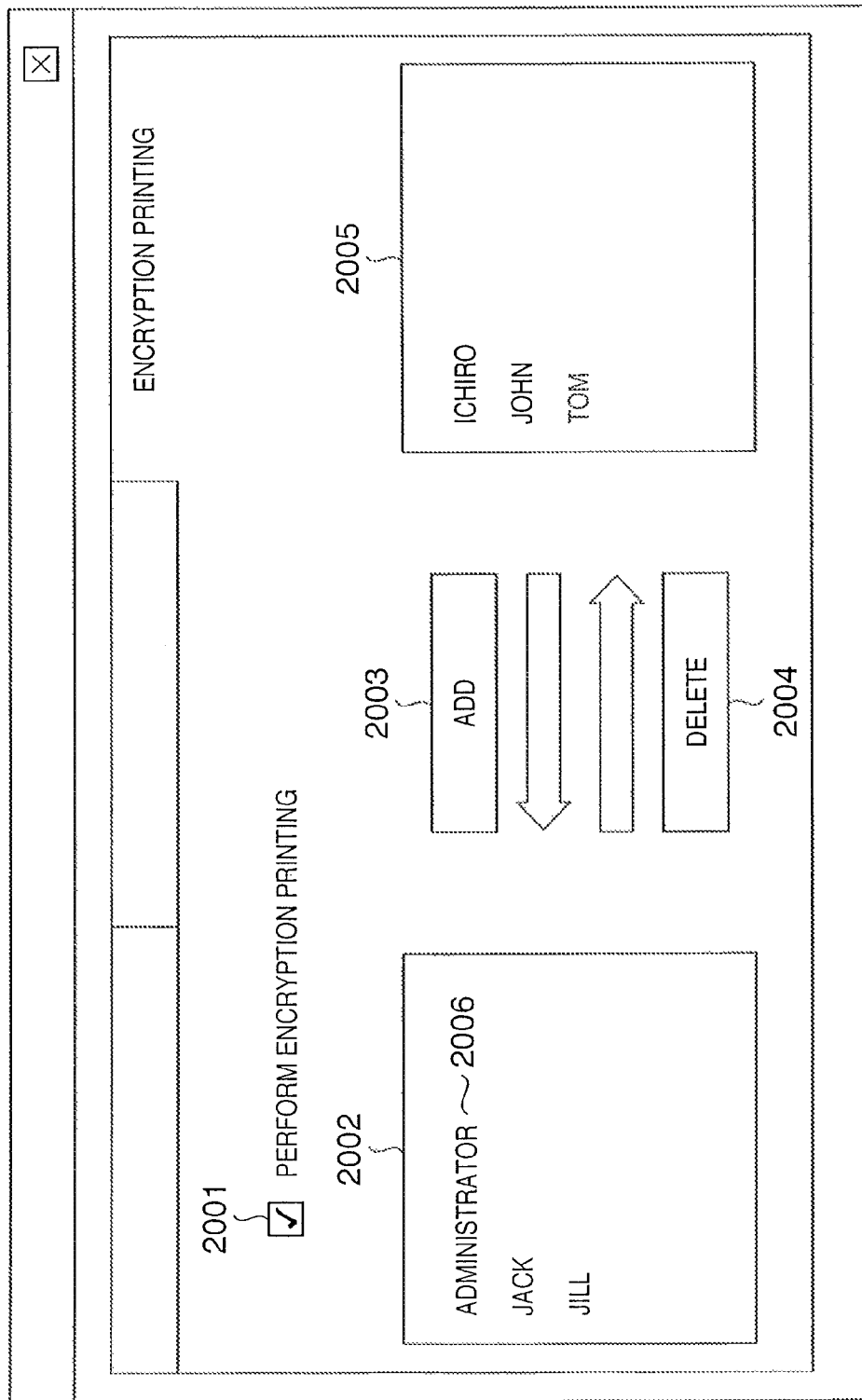
FIG. 20 is a view showing an example of the user interface of a printer driver which enables encryption printing.

FIG. 20 is a view showing an example of the user interface of a printer driver which enables encryption printing. In FIG. 20, reference numeral 2001 denotes a check box, and when the user checks this check box, print data is encrypted. Reference numeral 2002 denotes a decryption enable user list. When an add button 2003 is clicked, a target user is added to the decryption enable user list 2002. When a delete button 2004 is clicked, a target user is deleted from the decryption enable user list 2002. Reference numeral 2005 denotes a list of currently held public keys to which a public key can be added on request.

An administrator 2006 of the decryption enable user list 2002 cannot be deleted with the delete button 2004.

FIG. 21 is a view showing an example of the user interface of a tool for generating an install set capable of installing a printer driver with an administrator's public key. By using this tool, the administrator generates in advance an install set for installing his public key, and distributes the install set to a general user. A general user installs a printer driver by using the distributed install set.

The install set may be provided in an execute form so as to install a printer driver when a general user activates the install set, or may be provided in another form.

In FIG. 21, reference numeral 2101 denotes a site of an original driver before an administrator's public key is embedded. The site can be changed by clicking a change button 2102. Reference numeral 2103 denotes a generation destination of a printer driver install set at which an administrator's public key is embedded. The generation destination can be changed by clicking a change button 2104. Reference numeral 2105 denotes a site of an administrator's public key to be added. The site can be changed by clicking a change button 2106. By clicking a button 2107, an install set to install a selected public key is generated.

By the above-described processing, encrypted print data can be decrypted with a plurality of keys, and especially with an administrator's key, and thereby the administrator can decrypt encrypted print data and print it out for an audit. A printer driver install set with an administrator's public key is generated, the printer driver is installed in each client, and print data which can be decrypted with the administrator's key can be easily generated.

The encryption module may be separated as a dedicated application from a printer driver. In this case, a printer driver install set means a dedicated application install set.

As described above, according to the second embodiment, an encrypted print job can be decrypted even with an administrator's IC card in addition to a user's IC card, and printed by the administrator for an audit. Particularly when a key for encrypting a print job is encrypted with a plurality of second keys and these second keys are added to the print job, encrypted keys are added by the number of second keys to only one encrypted print job. As a result, the data size of the encrypted print job becomes smaller than that of a print job which is encrypted with two keys.

Further, the second embodiment can provide a low-cost encryption printing environment using a conventional system environment or printing apparatus.

[Modification 1 to Second Embodiment]

In the second embodiment, an administrator's key is saved in a client computer, and the printer driver adds the saved administrator's key in encryption printing. However, an administrator's key need not be held in a client computer. For example, the management server computer 1430 shown in FIG. 14 may be defined as a special computer which saves an administrator's key, and the printer driver may acquire the key from the management server computer 1430 every encryption printing.

In this case, when an administrator's key is changed, a key in each client computer need not be changed.

[Modification 2 to Second Embodiment]

As an example of practical use, the administrator may decrypt encrypted print data and print it at any time for an audit. However, some users may not always transmit print data containing an administrator's key, sometimes maliciously.

To cope with this situation, a step of transmitting print data to a printing apparatus and confirming whether an administrator's key has been added is added to operation of the printing apparatus.

If print data containing no administrator's key is found, it is deleted. A log of contents that a job is canceled because no administrator's key has been added is preferably left in the print log or the like.

When a job is canceled, a client computer may be notified of a message to this effect, and the message may be displayed.

The notification may use a dedicated application or another method such as e-mail.

[Modification 3 to Second Embodiment]

An administrator's key is not always authentic, and a malicious user may add a different administrator's key.

To cope with this situation, a step of confirming the authenticity of an administrator's key within a printing apparatus is added to operation of the printing apparatus.

The authenticity of an administrator's key can be confirmed by any method: it is inquired of the certificate authority every encryption printing, or the key of a current administrator is saved in a printing apparatus and compared.

Note that if the administrator's key is unauthentic data, print data can be deleted. In this case, it is preferable to leave a log message, which indicates that the print job in question was canceled due to an unauthentic administrator's key.

When a job is canceled, a client computer may be notified of a message to this effect, and the message may be displayed.

The notification may use a dedicated application or another method such as e-mail.

The present invention may be applied to a system including a plurality of devices (e.g., a host computer, interface device, reader, and printer) or an apparatus (e.g., a copying machine or facsimile apparatus) formed by a single device.

The object of the present invention is also achieved when a recording medium which records software program codes for realizing the functions of the above-described embodiments is supplied to a system or apparatus, and the computer (or the CPU or MPU) of the system or apparatus reads out and executes the program codes stored in the recording medium.

In this case, the program codes read out from the recording medium realize the functions of the above-described embodiments, and the recording medium which records the program codes constitutes the present invention.

The recording medium for supplying the program codes includes a Floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the recording medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiments.

The present invention can add an encryption function of encrypting print information without greatly changing an existing printing environment, and can prevent leakage of print information.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2005-171664 filed on Jun. 10, 2005, which is hereby incorporated by reference herein.

What is claimed is:

1. An information processing apparatus capable of communicating with a printing apparatus, comprising:
a generation unit configured to generate print job data in accordance with a printing instruction from an application;
a display unit configured to display a screen for designating whether or not to execute encryption processing of the print job data generated by the generation unit and for designating whether or not to save the print job data in the printing apparatus;
an encryption processing unit configured to perform encryption processing of the print job data when execution of the encryption processing of the print job data is designated on the screen; and
a control unit configured to
transmit the print job data encrypted by the encryption processing unit to the printing apparatus, in a case where the execution of the encryption processing is designated via the screen displayed by the display unit, and
transmit the print job data not encrypted by the encryption processing unit to the printing apparatus, in a case where the execution of the encryption processing is not designated via the screen displayed by the display unit,
wherein the control unit controls the information processing apparatus such that two processes respectively performed according to two designations are not both executed for the print job data, even if both designations are made for the print job data, wherein the two designations are a designation to execute the encryption processing and a designation to save the print job data in the printing apparatus, wherein the generation unit, the display unit, the encryption unit and the control unit are realized when one or more CPUs in the information processing apparatus execute programs stored in a memory of the information processing apparatus, wherein the generation unit includes a printer driver installed in each printing apparatus, the encryption processing unit includes a plug-in module, and the plug-in module is installed on the basis of the printer driver, and wherein the plug-in module extracts print data contained in the print job data, encrypts the extracted print data, and adds, to the print job data, identification information indicating that the print job data has been encrypted.

2. The apparatus according to claim 1, wherein the control unit controls the information processing apparatus not to transmit the print job data to the printing apparatus so that the two processes corresponding to the two designations are not executed simultaneously in the printing apparatus.

3. The apparatus according to claim 2, wherein the designation to save the print job data is detected by the plug-in module.

4. The apparatus according to claim 3, wherein the plug-in module extracts print data contained in the print job data, encrypts the extracted print data, and adds, to the print job data, identification information indicating that the print job data has been encrypted.

5. A method of controlling an information processing apparatus capable of communicating with a printing apparatus, the method comprising:

generating print job data in accordance with a printing instruction from an application;

displaying a screen for designating whether or not to execute encryption processing of the print job data generated in the generating step and for designating whether or not to save the print job data in the printing apparatus;

performing encryption processing of the print job data when execution of the encryption processing of the print job data is designated on the screen;

transmitting the print job data encrypted in the encryption processing step to the printing apparatus, in a case where the execution of the encryption processing is designated via the screen displayed in the displaying step; and transmitting the print job data not encrypted in the encryption processing step to the printing apparatus, in a case where the execution of the encryption processing is not designated via the screen displayed in the displaying step, wherein the information processing apparatus is controlled such that two processes respectively performed according to two designations are not both executed for the print job data, even if both designations are made for the print job data, wherein the two designations are a designation to execute the encryption processing and a designation to save the print job data in the printing apparatus, wherein the generating step, the displaying step, the encryption processing step and the transmitting step are realized when one or more CPUs in the information processing apparatus execute programs stored in a memory of the information processing apparatus, wherein the generating step is executed by a printer driver installed in the printing apparatus and the encryption processing is executed by a plug-in module installed on the basis of the printer driver, and wherein the plug-in module extracts print data contained in the print job data, encrypts the extracted print data, and adds, to the print job data, identification information indicating that the print job data has been encrypted.

6. The method according to claim 5, further comprising controlling the information processing apparatus so as not to transmit the print job data to the printing apparatus so that two processes corresponding to the two designations are not executed simultaneously in the printing apparatus.

7. The method according to claim 6, wherein the designation to save the print job data is detected by the plug-in module.

8. A non-transitory computer-readable storage medium comprising a computer program, which causes a computer to execute a method of controlling an information processing apparatus capable of communicating with a printing apparatus, the method comprising:

generating print job data in accordance with a printing instruction from an application;

displaying a screen for designating whether or not to execute encryption processing of the print job data generated in the generating step and for designating whether or not to save the print job data in the printing apparatus;

performing encryption processing of the print job data when execution of the encryption processing of the print job data is designated on the screen;

transmitting the print job data encrypted in the encryption processing step to the printing apparatus, in a case where the execution of the encryption processing is designated via the screen displayed in the displaying step; and transmitting the print job data not encrypted in the encryption processing step to the printing apparatus, in a case where the execution of the encryption processing is not designated via the screen displayed in the displaying step, wherein the information processing apparatus is controlled such that two processes respectively performed according to two designations are not both executed for the print job data, even if both designations are made for the print job data, wherein the two designations are a designation to execute the encryption processing and a designation to save the print job data in the printing apparatus, wherein the generating step, the displaying step, the encryption processing step and the transmitting step are realized one or more CPUs in the information processing apparatus execute programs stored in a memory of the information processing apparatus, wherein the generation step is performed by a printer driver installed in the printing apparatus and the encryption processing is performed by a plug-in module installed on the basis of the printer driver, and wherein the plug-in module extracts print data contained in the print job data, encrypts the extracted print data, and adds, to the print job data, identification information indicating that the print job data has been encrypted.

* * * * *